United States Patent [19]

Lawton

[11] 4,180,405
[45] Dec. 25, 1979

[54] HEAT-SENSITIVE RECORDING COMPOSITION WITH MIXED COLOR PRECURSORS

[75] Inventor: William R. Lawton, Orchard Park, N.Y.

[73] Assignee: Graphic Controls Corporation, Buffalo, N.Y.

[21] Appl. No.: 774,385

[22] Filed: Mar. 4, 1977

Related U.S. Application Data

[63] Continuation-in-part of Ser. No. 772,084, Feb. 25, 1977, and Ser. No. 774,210, Mar. 7, 1977.

[51] Int. Cl.$^2$ ............................................. C09K 3/00
[52] U.S. Cl. .................................... 106/14.5; 106/21; 106/22; 282/27.5; 427/148; 427/150; 428/411
[58] Field of Search ............................ 106/14.5, 21, 22; 282/27.5; 427/145, 148, 150; 428/411

[56] References Cited

U.S. PATENT DOCUMENTS

| | | | |
|---|---|---|---|
| 3,076,707 | 2/1963 | Lawton | 96/75 |
| 3,149,992 | 9/1964 | Lawton | 96/75 |
| 3,244,549 | 4/1966 | Farnham et al. | 427/145 |
| 3,916,068 | 10/1975 | Kohmura et al. | 428/411 |
| 3,944,422 | 3/1976 | Nihyakumen et al. | 427/148 |

*Primary Examiner*—Hosea E. Taylor
*Assistant Examiner*—Amelia B. Yarbrough
*Attorney, Agent, or Firm*—Kegan, Kegan & Berkman

[57] ABSTRACT

A heat sensitive recording member capable of acquiring a stable color in selected regions contrasting with the background color of the coated substrate upon exposing these regions to an elevated temperature and comprising a paper or polymeric film substrate and a heat sensitive coating comprising (1) an adduct or mixture of color-forming lactones or spiropyrans with a cyclic polyketo color precursor, (2) a polymeric binder which bonds the reactants to the substrate and optionally (3) a molecular complex between a phenolic compound and an amine and/or an activator to lower the temperature of color formation.

12 Claims, No Drawings

HEAT-SENSITIVE RECORDING COMPOSITION WITH MIXED COLOR PRECURSORS

This application is a continuation-in-part of my co-pending United States applications Ser. No. 772,084 filed Feb. 25, 1977 for HEAT-SENSITIVE RECORDING COMPOSITION WITH COMPLEXED PHENOLICS; and Ser. No. 774,210 filed Mar. 3, 1977 for HEAT-SENSITIVE COATING WITH 4-SUBSTITUTED PIPERDINE DERIVATIVE AND CYCLIC POLYKETO COMPOUND.

BACKGROUND OF THE INVENTION

This invention relates to recording members containing heat-reactive components and, more particularly, to recording members capable of being used in thermographic copying, thermal printing, event recording, and as transparencies for overhead projection.

Heat sensitive sheets containing the cyclic polyketo compounds of this invention, useful for copying and recording and characterized by an ability to form a mark of contrasting color when heated to an activation temperature of 50° C., are known in the art. They are used in thermographic processes wherein a recording member is positioned on a graphic original and exposed to infrared radiation to cause selective heating of the dark areas of the original sufficient to form a copy thereof on the heat sensitive member. The thermally responsive members have also been used to record the heated portions of a thermal print-head and to record a colored trace when contacted by the hot stylus of a thermal recorder. The ninhydrinamine reaction wherein ninhydrin reacts with amino acids, primary amines, and certain derivatives of morpholine, piperidine, and pyrrolidine to give the dye commonly referred to as Ruhrman's purple is well known. Isatin reacts with these same amines to give isatin blue. Alloxan reacts with the amines to give a red dye. These reactions have been used in numerous inventions for thermally responsive copy and recording papers and films. Lawton, U.S. Pat. No. 3,736,166 used ninhydrin with various morpholine and piperidine derivatives to prepare transparencies for overhead projection. Lawton, U.S. Pat. No. 3,293,061 combined ninhydrin or hydrindantin with isatin-amine condensates to provide thermographic copy sheets. Bauman and Lawton reacted ninhydrin or hydrindantin with complexes of amines and flavans or phenolic compounds to make thermographic copy sheets, see U.S. Pat. No. 3,149,991 and U.S. Pat. No. 3,149,992. Huffman, U.S. Pat. No. 3,664,858 combined ninhydrin with the adducts of morpholine or piperidine and organic acids in thermal recording members. Sus, U.S. Pat. No. 3,024,362 combined hydrindantin with amino acids or salts of primary amines with organic carboxylic and sulfonic acids to make a thermocopy paper. Allen, U.S. Pat. No. 2,967,785 used the adducts of morpholine or piperidine with isatin or ninhydrin as the color forming material in thermocopy papers. Small, U.S. Pat. No. 3,573,958 combined an amine with a halide or organometallic halide of germanium, silicone, lead, and tin with hydrindantin to provide a heat sensitive recording sheet. In each case the normal dye formations of Ruhrman's purple with ninhydrin, red dye with alloxan, and isatin blue were obtained.

It is often desirable and an objective of this invention to obtain colored records which have colors differing from those normally obtained with the above cyclic polyketo compounds.

Undesirable odors and fumes are obtained by the heat dissociation or decomposition of the complexes, salts, or adducts during the imaging process. There is a problem of image bleaching during excessive heating, on aging, or prolonged exposure to ultraviolet containing light.

Other types of heat sensitive recording sheets are also well known in the art. This invention is related to the use of a leuco or colorless form of a dye material and a phenolic material which reacts with the leuco material to form a colored dye. There are many systems of this type represented in the patent literature.

References for these systems include:

(1) Phthalides, naphthalides, fluorans

Typical of these are Crystal Violet Lactone or 3,3-bis-(p-dimethylaminophenyl)-6-dimethylamino phthalide and malachite green lactone or 3,3-bis(p-dimethylaminophenyl-phthalide). The reactions of these and many related phthalides with phenolics are described in Adachi, U.S. Pat. No. 3,895,173; Schwab, U.S. Pat. No. 3,322,557; Kohmura et al., U.S. Pat. No. 3,859,112; Hayashi et al., U.S. Pat. No. 3,773,542; Futaki et al., U.S. Pat. No. 3,846,153; Baum, U.S. Pat. No. 3,539,375; Shimazu, U.S. Pat. No. 3,864,684; Adachi et al., U.S. Pat. No. 3,843,384; Futaki et al., U.S. Pat. No. 3,829,401; Futaki et al., U.S. Pat. No. 3,825,432; Higachi et al, U.S. Pat. No. 3,816,838; Nagashima et al., U.S. Pat. No. 3,792,481; Blose et al., U.S. Pat. No. 3,746,675.

Typical examples of the lactones which are listed in the patents as reacting with phenolic materials to produce a color include the following:

Table I 3,3-bis(p-dimethylaminophenyl)-6-dimethylaminophthalide
3,3-bis(p-dimethylaminophenylphthalide)
3,3-bis[p-di(n-butylaminophenyl)phthalide]
Rhodamine lactone
3-[2-methyl-4-(diethylamino)phenyl]-3-(1,2-dimethyl-3-indolyl)phthalide
3-(p-dimethylaminophenyl)-3-(1-ethyl-2-methyl-3-indolyl)-4,5,6,7-tetrachlorophthalide
3,3-bis(1-ethyl-2-methylindol-3-yl)phthalide
3-(4-morpholinophenyl)-3-(1,2-dimethylindol-3-yl)-4,5,6,7-tetrachlorophthalide
3-(1-benzyl-2-methylindol-3-yl)-8-(methyl-2-methylindol-3-yl)phthalide
5-nitro-3,3-bis(4-dimethylaminophenyl)phthalide
5-amino-3,3-bis(4-dimethylaminophenyl)phthalide
5-benzoylamino-3,3-bis-(4-dimethylaminophenyl)phthalide
3,3-bis(p-dimethylaminophenyl)-4,5,6,7-tetrachlorophthalide
3,3-bis(p-diethylaminophenyl)-6-dimethylaminophthalide
3,3-bis(p-dimethylaminophenyl)-6-aminophthalide
3,3-bis(p-dimethylaminophenyl)-6-(p-toluenesulfonamide)phthalide
3,3-bis(p-dimethylaminophenyl)-6-nitrophthalide
3,3-bis(p-dimethylaminophenyl)-6-monethylaminophthalide
3,3-bis(p-dimethylaminophenyl)-6-chlorophthalide
3,3-bis(p-dimethylaminophenyl)-6-ethoxyphthalide
3,3-bis(p-dimethylaminophenyl)-6-diethylaminophthalide 3-(4-diethylaminophenyl)-3-(1,2-dimethylindol-3-yl)napthalide
3-(4-diethylaminophenyl)-3-(1-phenylpyrrol-3-yl)naphthalide
3-diethylamino-7-dibenzylaminofluoran
3-diethylamino-7-(N-methylanilino)fluoran
3-dimethylamino-6-methoxyfluoran
3-diethylamino-6-methyl-7-chlorofluoran
3-diethylamino-7-phenylfluoran
3-morpholino-5,6-benzofluoran
7-acetamino-3-dimethylaminofluoran
3-dimethylamino-5,7-dimethylfluoran
3,6-bis-β-methoxyethoxyfluoran
3,6-bis-β-cyanoethoxyfluoran
1-amino-3,6,7-trimethylfluoran
3-dibutylamino-6-methyl-7-chlorofluoran
3-diethylamino-7-dibenzylaminofluoran
3-diethylamino-7-(N-methyl-p-toluidino)fluoran
3-dimethylamino-7-chlorofluoran
3-(diethylamino)-6-methyl-7-anilinofluoran
3,7-bis(diethylamino)fluoran
3,6-dimethoxyfluoran
3-diamylamino-6-chlorofluoran
2',6'-bis(diethylamino)fluoran
2'-(benzylamino)-6'-(diethylamino)-3',4"-benzofluoran
3-(ethyl-p-tolylamino)-7-(methylphenylamino)fluoran
3-cyclohexylamino-6-chlorofluoran
3-diethylamino-5-methyl-7-bis(4-methylbenzyl)aminofluoran
3-diethylamino-6-methyl-7-(p-butylanilino)fluoran
2'-anilino-6'-diethylamino-3'-methylfluoran
3-(diethylamino)-7-(N-methylanilino)fluoran
2'-phenylamino-3'-methyl-6'-(N-ethyl-N-p-tolylamino)fluoran
3-diethylamino-7-piperidinofluoran
3-diethylamino-5-chloro-7-piperidinofluoran
3-diethylamino-5-methyl-7-piperidinofluoran
2-(2',4'6'-trimethylphenylamino)-8-diethylamino-3,4-benzofluoran
2,8-bis(N-ethyl-N-p-tolylamino)fluoran
3-diethylamino-6-methyl-7-o-anisidinofluoran
3-(diethylamino)-6,7-dimethylfluoran
3-dimethylamino-5-methyl-7-[bis-(4-methylbenzyl)amino]fluoran
4-amino-8[bis-β-ethoxyethyl)amino]benzofluoran
N,N'-bis(3'-diethylaminofluoran-7'yl)piperazine
2-phenylamino-6-diethylaminofluoran
2-phenylamino-6-dimethylaminofluoran
3'-diethylamino-7'-methylthiofluoran
3,7-bis(diethylamino)-5,6-benzofluoran
3-dimethylamino-7-benzylamino-5,6-benzofluoran
3-diethylamino-7-(N-benzyl-N-phenyl)aminofluoran
3-benzylamino-7-diethylaminofluoran
2'-(p-chloroanilino)-6'-diethylaminofluoran
2'-(m-chloroanilino)-3-methyl-6'-diethylaminofluoran
2'-(p-chloro-N-methylanilino)-6'-diethylaminofluoran
3-(diethylamino)-5-methyl-7-(β-phenylhydrazino)fluoran
3-(diethylamino)-7-bis(1-naphthylmethyl)aminofluoran
3-(diethylamino)-7-(2-phthalimidino)fluoran
3-(diethylamino)-6-methyl-3'-azafluoran
3-diethylamino-5-methyl-7-(diphenylamino)fluoran
3-(dimethylamino)-7-(diphenylmethylamino)fluoran
3-(diethylamino)-6-methyl-7-(p,p'-dimethyldiphenylmethyl)aminofluoran
3-(dibutylamino)-7-(diphenylmethylamino)fluoran
3-(diethylamino)-7-(β,β-dibenzylhydrazino)fluoran
3-(dimethylamino)-7-(p-methoxybenzamido)fluoran
7-anilino-3-(diethylamino)fluoran
2'-(methylphenylamino)-6'-(methyl-p-tolylamino)fluoran
2'-methyl-6'-cyclohexylaminofluoran
2'-amino-6'-diethylamino-3'-methylfluoran
2'-amino-6'-diethylaminofluoran
2'-(2-carboxyanilino)-6'-diethylaminofluoran
3-dibenzylamino-7-diethylaminofluoran
2'-[N-(carboethoxymethyl)amino]-6'-diethylaminofluoran
2'-[N-(carbethoxymethyl)-N-methylamino]-6'-diethylaminofluoran
Rhodamine lactam
N-phenyl Rhodamine lactam
Rhodamine anilino lactam
9-p-nitroamino-3,6-bis(diethylamino)-9-Xanthenoyl-6-benzoic acid lactam
9-p-nitroamino-3,6-bis(dimethylamino)-9-thioxanthenoyl-6-benzoic acid lactam (2) Spiropyrans The following are some of the patents which list typical spiropyrans giving a color when reacted with phenolic materials: Talvakar, U.S. Pat. No. 3,445,261; Futaki et al, U.S. Pat. No. 3,829,401; Kohmura et al., U.S. Pat. No. 3,859,112; Hayashi et al, U.S. Pat. No. 3,773,542; Kimura et al, U.S. Pat. No. 3,666,525; Yahagi et al, Japanese Pat. No. 73-63,734; Futaki et al, Germany Pat. No. 2,252,845; Komura et al, German Pat. No. 2,327,135; Takamizawa et al, Japanese Pat. No. 74-00,069; Robillard et al, French Pat. No. 2,204,151; Haino et al, Japanese Pat. No. 75-01,746; Samat et al, German Pat. No. 2,522,877; Miyazawa et al, Japanese Pat. No. 75-137,146; Takimoto et al, Japanese Pat. No. 75-152,742; Futaki et al, German Pat. No. 2,252,845; Miyazawa et al, Japanese Pat. No. 75-137,549.

Typical examples of the spiropyrans listed in the patents as reacting with phenolic materials to yield colored dyes include:

TABLE II

6'-chloro-8'-methoxybenzoindolinospiropyran
benzothiazolinospiropyran
benzo-β-naphthospiropyran
3-methyl-di-β-naphthospiropyran
1,3,3-trimethyl-6'-chloro-8'-methoxyindolinobenzospiropyran
6'chloro-8'-methoxyindolinobenzospiropyran
6-chloro-8-methoxy-1',3',3'-trimethylspiro(1-benzopyran-2,2'-indoline)
spiro(1-benzopyran-2,2'-naphthopyran)
8'-methoxybenzoindolinospiropyran
1,3,3-trimethyl-4,7,8'-trimethoxy[(2'H-1'-benzopyran)-2,2'-indoline]
6-chloro-8'-methyl-1,3,3-trimethylbenzoindolinospiropyran
2-ethyl-3,3'-spirobinaphthopyran
3-phenyl-di-β-naphthospiropyran
di-β-naphthospiropyran
3-ethyl-di-β-napththospiropyran
3,3'-dichlorospirodinaphthopyran
1,3,3-trimethyl-6'-nitrospiro(2'H-1'-benzopyran-2,2'-indoline)
1,3,3-trimethyl-8'-nitrospiro(2'H-1'-benzopyran-2,2'-indoline)
1,3,3-trimethyl-6'-nitro-8'-methoxyspiro(2'H-1'-benzopyran-2,2'-indoline)

1,3,3-trimethyl-5'-nitro-8'-methoxyspiro(2'H-1'-benzo-
  pyran-2,2'-indoline)
3,7-bis(3',6'-dimethoxy-9'-spiroxanthyl)pyromellitide Typical examples of phenolic materials listed in the patent literature as reacting with the leuco compounds such as the phtalides, naphthalides, fluorans, and spiropyrans to form colored dyes include:

TABLE III 4,4'-isopropylidene diphenol
4,4'-isopropylidene-bis(2-methylphenol)
4,4'-isopropylidene bis(2-phenylphenol)
4,4'-isopropylidene-bis(2-t.butylphenol)
4,4'-sec.butylidene-diphenol
4,4'-sec.butylidene bis(2-methylphenol)
4,4'-cyclohexylidene diphenol
4,4'-cyclohexylidene-bis(2-isopropylphenol)
4,4'-ethylidene-diphenol
2,2'-methylenebis(5-methylphenol)
4,4'-ethylidene bis(2-methylphenol)
4,4'-(1-methylpentylidene)diphenol
4,4'-(methylisopentylidene)diphenol
4,4'-(1-methylhexylidene)diphenol
4,4'-(1-ethylbutylidene)diphenol
4,4'-(ethylpropylidene)-bis(2-methylphenol)
4,4'-isopropylidenedicatechol
4,4'-benzylidene-diphenol
4,4'-isopropylidene-bis(2-chlorophenol)
2,2'-dihydroxydiphenyl
2,2'-methylenebis(4-chlorophenol)
2,2'-methylene bis(4-methyl-6-t.butylphenol)
2,2'-methylene bis(4-methyl-6-t.butylphenol)
4,4'-isopropylidene bis (2,6-dimethyl phenol)
2,2'-thiobis(4,6-dimethylphenol)
4,4'-ethylene diphenol
4,4'-(1-methylbenzylidene)diphenol
4-t.butylphenol
4-phenylphenol
α-naphthol
β-naphthol
hydroquinone
pyrocatechol
pyrogallol
phloroglucine
m.cresol There are a number of commercial products which use the above-described combinations of leuco dyes and phenolic derivatives. These have found applications in thermal copying paper using 3M's Thermofax and other models of thermal copiers. Thermally responsive sheets using these materials have also been used with computer-driven thermal printers such as Texas Instrument's Silent 700 Thermal Printer. Sensitized papers containing a combination of leuco dyes and phenolic materials are used in chart recording instruments wherein a colored trace record is obtained by contacting the paper with a hot pen or stylus. There are certain inherent disadvantages found with the leuco dye-phenolic combinations. Complaints are received on background staining, fading of the record mark, flooding of the image, moisture sensitivity, odor, pressure sensitivity causing accidental marking by paper clips and the like, railroading, and burnout on chart recording papers. Many of the phenolic materials described in the patents are toxic or irritating and cannot be used. These same leuco dye-phenolic color-forming systems are used in the "carbonless" pressure marking papers and the reactants are kept separate by microencapsulation or by being contained in separate layers. Pressure contact of these materials results in dye formation. This property is also inherent in the thermal papers and excess pressure will cause accidental marking. Also, for this same reason, the reactants must be ground separately and a solvent or resin binder-solvent combination which will dissolve or partially dissolve one or both of the co-reactants will result in premature dye formation in the coating mix. The object of this invention is to eliminate or minimize the problems incurred with the leuco dye-phenolic thermal color-reacting systems. Another objective is to minimize the sublimation or migration of the phenolic material which has caused problems with staining and change in sensitivity. Still another objective is the manufacture of thermal record sheets with improved image sharpness and definition.

SUMMARY OF THE INVENTION

I have found that the problems and disadvantages of the above described thermal recording systems can be minimized or eliminated by using a combination of leuco dye precursors of the lactone or spiropyran types with cyclic polyketo compounds such as ninhydrin, hydrindantin, isatin, alloxan, and their homologs. I have found that the color precursors may be chemically combined as adducts or chemical complexes of one another which are light in color but can be converted by heat to a dark colored dye. The dye thus formed is not typical of either of the co-reacting color precursors but rather produces a color additive effect approaching the black dyes most desired for imaging purposes. I have further found that a similar additive effect is obtained when the individual color precursors are mixed together and heated. Presumably, the precursors go through the adduct or complex forming process during fusion and are converted to the final dye by further heating. I have further discovered that molecular complexes of phenolic compounds with amines can be added to the mixtures or adducts of the combined precursors resulting in an increase in dye intensity of the image and also providing faster thermal response at lower temperatures during the imaging process. I have further discovered that certain additives may be used with the color precursor adducts or complexes, mixtures of the color precursors, or a combination of these with molecular complexes of phenolics and amines to further increase the color intensity of the image and also increase the rate of thermal response during imaging.

DETAILED DESCRIPTION OF INVENTION

Materials a. Lactones

Crystal Violet lactone (3,3-bis-(p-dimethylaminophenyl)-6-dimethylaminophthalide), Malachite Green lactone (3,3-bis(p-dimethylaminophenyl)phthalide), and 3,3-bis(1-ethyl-2-methylindol-3-yl)phthalide were obtained from the Hilton-Davis Co., Cincinnati, Ohio. The 3,3-bis(p-aminophenyl)phthalide was obtained from the Organic Chemicals Div., Eastman Kodak Co., Rochester, NY.

b. Spiropyrans

The indolinospiropyrans were prepared in the normal manner by well known methods described in the art by refluxing equimolar amounts of the desired Fischer's base, in these examples 1,3,3-trimethyl-2-methylene indoline or the 5-chloro derivative of the same with the desired aldehyde, e.g., salicylaldehyde, 5- nitrosalicylaldehyde, 5-bromo-salicylaldehyde, 3,5-dibromosalicylaldehyde, and o-vanillin in absolute alcohol for three to four hours, cooling, filtering, and washing the precipitate with alcohol and drying. Similarly, 2-methylbenzothiazolium methyl tosylate was reacted with 2-hydroxy-1-naphthaldehyde and with salicylaldehyde to give the corresponding spiropyrans. The 3-methyl-di-β-naphthospiropyran was obtained in the usual manner by treating 2-hydroxy-1-naphthaldehyde and methylethyl ketone in absolute ethanol with hydrogen chloride gas and neutralizing the salt formed with sodium carbonate and recrystallizing the product from benzene.

c. Adducts or complexes of lactones or spiropyrans with cyclic ketones including ninhydrin and isatin.

These were prepared by boiling with stirring for thirty minutes a mixture of 15 parts of lactone or spiropyran and 15 parts of ninhydrin or isatin in 250 parts anhydrous denatured alcohol. The hot mother liquor was decanted from the residue, chilled in a cold box to crystallize and precipitate the adduct, and the precipitated adduct was washed with alcohol and air dried.

d. Complexes

The phenolic material is dissolved in anhydrous methanol or ethanol to form a 25 percent solution. The hydrogen bonding co-reactant amine or amide is added to the alcoholic solution of the phenolic derivative in molecular equivalents corresponding to the number of functional hydroxyl groups in the phenolic compound. For example, two moles of cyclohexylamine are added to one mole of a bisphenol, one mole of amine is added to one mole of a mono-hydroxy compound, etc. The mixtures are stirred for a few minutes until they become homogeneous. In some cases, a solid complex will form and precipitate almost immediately, while others must be chilled in a cold box before solid products are obtained. The mixture containing the precipitated complex is then filtered and the precipitate is washed with alcohol and allowed to dry. The following table contains a number of hydrogen-bonded phenolic complexes which have been prepared in this manner.

TABLE IV

AROMATIC HYDROXY COMPLEXES

| Phenol | Amine | Dissociation Temp. °C. |
|---|---|---|
| p,p' biphenol | ethylene diamine | 136–140 |
| " | t.butyl amino ethyl methacrylate | |
| Bisphenol B | ethylenediamine | 85–92 |
| " | formamide | 64–66 |
| " | t.butyl aminoethyl methacrylate | 94–6 |
| 4,4'-isopropylidene bis (2-isopropylphenol) | triethanolamine | 60–63 |
| 4,4'-isopropylidene bis (2-isopropylphenol) | ethylene diamine | 100–4 |
| 4,4'-isopropylidene bis (2,6-dibromophenol) | diethanol amine | 107–145 |
| 4,4'-isopropylidene bis (2,6-dibromophenol) | triethanolamine | 128–157 |
| 4,4'-isopropylidene bis (2,6-dibromophenol) | ethylene diamine | 198–215 |
| 4,4'-isopropylidene bis (2,6-dibromophenol) | diethylenetriamine | 210–215 |
| 4,4'-isopropylidene bis (2,6-dibromophenol) | propylene diamine | 146–156 |
| 4,4'-isopropylidene bis (2,6-dibromophenol) | formamide | 95–102 |
| 4,4'-isopropylidene bis (2,6-dibromophenol) | hydrazine | 135–150 |
| 4,4'-isopropylidene bis (2,6-dibromophenol) | t.-butyl aminoethyl methacrylate | 130–5 |
| 4-hydroxy propiophenone | hydrazine | 84–90 |
| 2,4-dichloro-6-phenylphenol | ethylenediamine | 100–4 |
| " | diethylenetriamine | 115–20 |
| " | propylenediamine | 92–4 |
| 2,2'-methylenebis (3,4,6-trichlorophenol) (Hexachlorophene) | diethanolamine | 75–8 |
| " | triethanolamine | 118–23 |
| " | ethylenediamine | 124–7 |
| " | diethylenetriamine | 90–110 |
| " | propylene diamine | 125–30 |
| " | formamide | 125–30 |
| " | hydrazine | 180–4 |
| " | t-butylamine ethyl methacrylate | 123–6 |
| 2-bromo-4-phenyl phenol | ethylenediamine | 66–8 |
| " | diethylene triamine | 78–82 |
| " | formamide | 55–8 |
| p-phenyl phenol | ethylene diamine | 137–43 |
| " | diethylene triamine | 99–104 |
| " | propylene diamine | 77–81 |
| " | formamide | 90–5 |
| " | hydrazine | 145–150 |
| 2,2'-thiobis | | |

TABLE IV-continued
AROMATIC HYDROXY COMPLEXES

| Phenol | Amine | Dissociation Temp. °C. |
|---|---|---|
| (4,6-dichlorophenol) (Actomer) | triethanolamine | 120-5 |
| " | ethylene diamine | 125-130 |
| " | diethylene triamine | 158-164 |
| " | propylene diamine | 142-5 |
| " | formamide | 115-25 |
| " | hydrazine | 195-200 |
| 4,4' isopropylidenebis (2,6-dichlorophenol) (Tetrachlorobisphenol A) | ethylenediamine | 192-5 |
| " | diethylene triamine | 210-15 |
| " | propylene diamine | 170-5 |
| " | formamide | 100-5 |
| " | hydrazine | 142-6 |
| " | t-butyl amine ethyl methacrylate | 132-5 |
| 5-chloro-2-hydroxy benzophenone | ethylene diamine | 190-4 |
| o-phenylphenol (Dowicide 1) | ethylene diamine | 55-60 |
| " | formamide | 50-3 |
| " | hydrazine | 60-4 |
| Dichlorophene | formamide | 90-3 |
| 2,2'-methylenebis (4-ethyl-6-t.butylphenol) (Antioxidant 425) | triethanolamine | 68-70 |
| Bisphenol A | ethylene diamine | 100-4 |
| " | propylene diamine | 94-100 |
| " | t-butylamine ethyl methacrylate | 90-2 |
| 4,4'-thiobis (6-t.butyl-m-cresol) (Santowhite crystals) | triethanolamine | 95-8 |
| " | ethylene diamine | 106-11 |
| " | propylene diamine | 125-35 |
| " | t.butylamine ethyl methacrylate | 62-5 |
| 4,4'-butylidenebis (6-t.butyl-m-cresol) (Santowhite Powder) | triethanolamine | 68-70 |
| 2,2'-methylenebis (4-methyl-6-t.butylphenol) (Antioxidant 2246) | diethanolamine | 62-5 |
| " | ethylene diamine | 54-8 |
| p-cyclohexyl phenol | triethanolamine | 35-40 |
| " | ethylene diamine | 125-30 |
| " | diethylene triamine | 70-85 |
| " | propylene diamine | 88-90 |
| o-cyclohexyl phenol | ethylene diamine | 88-93 |
| " | hydrazine | 75-80 |
| p-t.butyl phenol | ethylene diamine | 70-3 |
| " | propylene diamine | 54-7 |
| p.-sec. butyl phenol | ethylene diamine | 50-4 |
| p-bromophenol | formamide | 35-8 |
| 2,4,6-tribromophenol | ethylenediamine | 135-8 |
| " | propylenediamine | 85-9 |
| " | formamide | 90-3 |
| pentachlorophenol | diethanolamine | 145-55 |
| " | triethanolamine | 133-7 |
| " | ethylenediamine | 115-20 |
| " | diethylenetriamine | 185-90 |
| " | propylene diamine | 168-72 |
| " | formamide | 100-5 |
| " | hydrazine | 200-5 |
| " | t-butyl amine ethyl methacrylate | 115-20 |
| 2,6-dichlorophenol | triethanolamine | 83-6 |
| " | ethylene diamine | 110-15 |
| " | propylenediamine | 100-155 |
| " | formamide | 40-5 |
| " | hydrazine | 115-20 |
| " | t.butyl amine ethyl methacrylate | 100-5 |
| 2-chloro-4-phenyl phenol | ethylene diamine | 130-5 |
| " | propylene diamine | 50-4 |
| " | hydrazine | 108-12 |
| tetrachlorophenol (Dowicide 6) | diethanolamine | 110-25 |
| " | triethanolamine | 98-104 |
| " | ethylene diamine | 192-5 |

TABLE IV-continued
AROMATIC HYDROXY COMPLEXES

| Phenol | Amine | Dissociation Temp. °C. |
|---|---|---|
| " | propylene diamine | 165-70 |
| " | formamide | 85-90 |
| " | hydrazine | 163-5 |
| " | t.-butyl amino ethyl methacrylate | 95-100 |
| 2,4,6-trichlorophenol | ethylene diamine | 105-14 |
| " | propylene diamine | 100-5 |
| " | formamide | 85-90 |
| " | hydrazine | 150-7 |
| " | t.-butyl amine ethyl methacrylate | 70-5 |
| β-β-ethylenediimino-o-cresol | formamide | 105-10 |
| " | t.butylamine ethyl-methacrylate | 118-12 |
| Bisphenol A | benzylamine | 70-4 |
| 4,4'-isopropylidenebis (2,6-dibromophenol) (Tetrabromobisphenol A) | 2-amino-1-butanol | 155-62 |
| " | aminoethylenethanolamine | 74-85 |
| " | 2-amino-2-ethyl-1,3-propenediol | 130-40 |
| " | 2-amino-2-methyl-1,3-propenediol | 154-60 |
| " | aminoethyl piperazine | 140-50 |
| " | 2-amino-2-methyl-1-propanol | 180-90 |
| " | 2-amino-1-phenyl-1-propanol | 100-30 |
| " | 3-amino propanol | 190-5 |
| " | benzylamine | 144-8 |
| " | chloroacetamide | 114-22 |
| " | 3-chloro-N-methyl-acetamide | 80-5 |
| Tetrabromobisphenol A | n-decylamine | 170-90 |
| "" | 1,3-diamino propane | 218-225 |
| " | 3-di-n-butyl amino propylamine | 150-8 |
| " | diethanolamine | 140-3 |
| " | diethyl amino ethoxy ethanol | 180-5 |
| " | diethylamino propylamine | 175-85 |
| "" | N-diethyl amino propyl-1-methyloctadecylamine | 88-100 |
| " | diethylisopropanolamine | 135-42 |
| " | diisopropanolamine | 65-75 |
| " | diisopropylethanolamine | 158-165 |
| " | dimethylacetamine | 95-100 |
| " | dimethylamino propylamine | 198-202 |
| " | dimethylethanolamine | 135-45 |
| " | dimethylformamide | 60-5 |
| " | N-(1,1-dimethyl-2-hydroxy ethyl)-2-methyl 1-1, 2-Propane diamine | 130-40 |
| Tetrabromobisphenol A | t.-dodecylaminopropylamine | 90-105 |
| " | ethanolamine | 170-80 |
| " | N-ethylethanolamine | 90-100 |
| " | N-ethyldiethanolamine | 137-42 |
| " | hexamethyl phosphoramide | 127-30 |
| " | n-hexylamine | 200-10 |
| " | hydroxyethyl diethylene triamine | 60-80 |
| " | N-2-hydroxyethyl-1-methyl dodecylamine | 100-110 |
| " | N-hydroxyethyl piperazine | 190-200 |
| " | hydroxy ethyl trihydroxy propyl-ethylene diamine | 45-55 |
| " | iminobispropylamine | 210-20 |
| " | isobutylamine | 160-70 |
| " | isopropylamine | 165-75 |
| " | 3-isopropoxypropanolamine | 165-75 |
| " | isopropylamine | 160-70 |
| " | methanediamine | 140-5 |
| " | methyldiethanolamine | 132-6 |
| " | methyl ethanol amine | 143-6 |
| " | N-methyl-bis-amino propylamine | 210-20 |
| " | polyglycol amine H-119 | 115-20 |
| "" | polyglycolamine H-176 | 195-205 |
| " | polyglycolamine H-221 | 165-174 |

TABLE IV-continued
AROMATIC HYDROXY COMPLEXES

| Phenol | Amine | Dissociation Temp. °C. |
|---|---|---|
| " | 1,2-propanediamine | 150–160 |
| " | propylenediamine | 148–155 |
| " | tetramethylethylenediamine | 190–200 |
| " | tetramethylguanidine | 225–235 |
| " | triethanolamine | 154–8 |
| " | triethylene tetramine | 200–15 |
| " | triisopropanolamine | 135–9 |
| p,p'-biphenol | hexamethyl phosphoramide | 40–50 |
| 4-hydroxy propiophenone | hydrazine | 84–90 |
| 2,2'-methylene bis (2,4,6-trichlorophenol) | aminoethylethanolamine | 165–7 |
| | 2-amino-2-ethyl-1,3-propanediol | 151–70 |
| " | 2-amino-2-methyl-1,3-propanediol | 182–4 |
| " | benzylamine | 210–16 |
| " | t-butylaminoethyl methacrylate | 123–6 |
| " | diethanolamine | 75–8 |
| " | diethylenetriamine | 90–110 |
| 2,2'-methylene bis (2,4,6-trichlorophenol) | dimethylethanolamine | 183–93 |
| 2,2'-methylene bis (2,4,6-trichlorophenol) | N-ethyldiethanolamine | 124–7 |
| 2,2'-methylene bis (2,4,6-trichlorophenol) | ethylene diamine | 187–92 |
| 2,2'-methylene bis (2,4,6-trichlorophenol) | formamide | 125–30 |
| 2,2'-methylene bis (2,4,6-trichlorophenol) | hexamethyl prosphoramide | 85–90 |
| 2,2'-methylene bis (2,4,6-trichlorophenol) | hydrazine | 180–4 |
| 2,2'-methylene bis (2,4,6-trichlorophenol) | N-methylbisamino propylamine | 157–65 |
| 2,2'-methylene bis (2,4,6-trichlorophenol) | methyldiethanolamine | 154–7 |
| 2,2'-methylene bis (2,4,6-trichlorophenol) | methylethanolamine | 193–200 |
| 2,2'-methylene bis (2,4,6-trichlorophenol) | polyglycolamine H-176 | 208–24 |
| 2,2'-methylene bis (2,4,6-trichlorophenol) | propylenediamine | 135–40 |
| 2,2'-methylene bis (2,4,6-trichlorophenol) | triethanolamine | 142–6 |
| 2,4-dichloro-6-phenyl phenol | diethylene triamine | 115–20 |
| " | ethylene diamine | 100–4 |
| " | propylenediamine | 92–4 |
| 2-bromo-4-phenyl phenol | benzylamine | 85–95 |
| " | diethylenetriamine | 78–82 |
| " | ethylenediamine | 66–8 |
| " | formamide | 55–8 |
| " | hydrazine | 82–8 |
| p-phenyl phenol | benzylamine | 70 |
| " | diethlenetriamine | 99–104 |
| " | ethylenediamine | 137–43 |
| " | formamide | 113–5 |
| " | hexamethyl phosphoramide | 34–5 |
| " | hydrazine | 155–8 |
| " | propylene diamine | 71–81 |
| " | triethylene tetramine | 63–5 |
| 2,2'-thiobis (4,6-dichlorophenol | 2-amino-2-ethyl-1,3-propanediol | 125–59 |
| 2,2'-thiobis (4,6-dichlorophenol | benzylamine | 197–9 |
| 2,2'-thiobis (4,6-dichlorophenol | diethanolamine | 143–7 |
| 2,2'-thiobis (4,6-dichlorophenol | diethylene triamine | 158–74 |
| 2,2'-thiobis (4,6-dichlorophenol | diisopropanolamine | 155–62 |
| 2,2'-thiobis (4,6-dichlorophenol | dimethylacetamide | 190–3 |
| 2,2'-thiobis (4,6-dichlorophenol | dimethylethanol amine | 120–3 |
| 2,2'-thiobis (4,6-dichlorophenol | N-ethyldiethanolamine | 127–30 |
| 2,2'-thiobis (4,6-dichlorophenol | ethylene diamine | 125–30 |

TABLE IV-continued
AROMATIC HYDROXY COMPLEXES

| Phenol | Amine | Dissociation Temp. °C. |
|---|---|---|
| 2,2'-thiobis (4,6-dichlorophenol | hydrazine | 195–200 |
| 2,2'-thiobis (4,6-dichlorophenol | iminobispropylamine | 50–74 |
| 2,2'-thiobis (4,6-dichlorophenol | methyldiethanolamine | 127–40 |
| 2,2'-thiobis (4,6-dichlorophenol | polyglycolamine H-176 | 210–14 |
| 2,2'-thiobis (4,6-dichlorophenol | propylene diamine | 142–5 |
| 2,2'-thiobis (4,6-dichlorophenol | formamide | 115–25 |
| 2,2'-thiobis (4,6-dichlorophenol | triethanolamine | 165–8 |
| 2,2'-thiobis (4,6-dichlorophenol | triisopropanolamine | 151–5 |
| 2,2' methylene bis (4-chlorophenol) | benzylamine | 60–100 |
| 2,2' methylene bis (4-chlorophenol) | formamide | 90–3 |
| 4,4'-isopropylidene bis (2,6-dichlorophenol) | 2-amino-1-butanol | 166–70 |
| 4,4'-isopropylidene bis (2,6-dichlorophenol) | aminoethylethanolamine | 154–8 |
| 4,4'-isopropylidene bis (2,6-dichlorophenol) | 2-amino-2-ethyl-1,2-propanediol | 166–8 |
| 4,4'-isopropylidene bis (2,6-dichlorophenol) | 2-amino-2-methyl-1,3-propanediol | 172–5 |
| 4,4'-isopropylidene bis (2,6-dichlorophenol) | 3-amino propanol | 180–90 |
| 4,4'-isopropylidene bis (2,6-dichlorophenol) | amylamine | 200–10 |
| 4,4'-isopropylidene bis (2,6-dichlorophenol) | aniline | 90–6 |
| 4,4'-isopropylidene bis (2,6-dichlorophenol) | benzylamine | 145–55 |
| 4,4'-isopropylidene bis (2,6-dichlorophenol) | t-butylaminoethyl methacrylate | 132–5 |
| 4,4'-isopropylidene bis (2,6-dichlorophenyl) | cyclohexylamine | 190–204 |
| 4,4'-isopropylidene bis (2,6-dichlorophenol) | n-decylamine | 193–8 |
| 4,4'-isopropylidene bis (2,6-dichlorophenol) | 1,3-diamino propane | 230–5 |
| 4,4'-isopropylidene bis (2,6-dichlorophenol) | dibutylamine | 124–57 |
| 4,4'-isoproylidene bis (2,6-dichlorophenol) | 3-di-n-butylamine propylamine | 155–64 |
| 4,4'-isopropylidene bis (2,6-dichlorophenol) | dibutylmethylamine | 120–31 |
| 4,4'-isopropylidene bis (2,6-dichlorophenol) | dicyclohexylamine | 202–6 |
| 4,4'-isopropylidene) (2,6-dichlorophenol) | diethanolamine | 150–3 |
| 4,4'-isopropylidene bis (2,6-dichlorophenol) | diethylamine | 142–7 |
| 4,4'-isopropylidene bis (2,6-dichlorophenol) | diethylaminoethyl methacrylate | 115–7 |
| 4,4'-isopropylidene bis (2,6-dichlorophenol) | β-diethylaminopropionitrile | 94–6 |
| 4,4'-isopropylidene bis (2,6-dichlorophenol) | 3-ethylamino propionitrile | 103–5 |
| 4,4'-isopropylidene bis (2,6-dichlorophenol) | di-2-ethylhexylamine | 100–5 |
| 4,4'-isopropylidene bis (2,6-dichlorophenol) | diethylene triamine | 210–15 |
| 4,4'-isopropylidene bis (2,6-dichlorophenol) | diethylisopropanolamine | 125–35 |
| 4,4'-isopropylidene bis (2,6-dichlorophenol) | diisopropylethanolamine | 162–4 |
| 4,4'-isopropylidene bis (2,6-dichlorophenol) | diisopropylamine | 141–52 |
| 4,4'-isopropylidene bis (2,6-dichlorophenol) | β-dimethylamino propionitrile | 70–3 |
| 4,4'-isopropylidene bis (2,6-dichlorophenol) | dimethylaminopropylamine | 197–203 |
| 4,4'-isopropylidene bis (2,6-dichlorophenol) | dimethylenethanolamine | 140–6 |

TABLE IV-continued
AROMATIC HYDROXY COMPLEXES

| Phenol | Amine | Dissociation Temp. °C. |
|---|---|---|
| 4,4'-isopropylidene bis (2,6-dichlorophenol) | di-n-propylamine | 142-53 |
| 4,4'-isopropylidene bis (2,6-dichlorophenol) | 3-t.-dodecylaminopropylamine | 100-5 |
| 4,4'-isopropylidene bis (2,6-dichlorophenol) | ethanolamine | 96-104 |
| 4,4'-isopropylidene bis (2,6-dichlorophenol) | N-ethylcyclohexylamine | 161-78 |
| 4,4'-isopropylidene bis (2,6-dichlorophenol) | N-ethyldiethanolamine | 154-5 |
| 4,4'-isopropylidene bis (2,6-dichlorophenol) | ethylene diamine | 208-10 |
| 4,4'-isopropylidene bis (2,6-dichlorophenol) | N-ethylethanolamine | 87-110 |
| 4,4'-isopropylidene bis (2,6-dichlorophenol) | formamide | 103-8 |
| 4,4'-isopropylidene bis (2,6-dichlorophenol) | hexamethylphosphoramide | 122-4 |
| 4,4'-isopropylidene bis (2,6-dichloropenol) | n-hexylamine | 168-85 |
| 4,4'-isopropylidene bis (2,6-dichlorophenol) | hydrazine | 142-6 |
| 4,4'-isopropylidene bis (2,6-dichlorophenol) | hydroxyethylethylene diamine | 94-100 |
| 4,4'-isopropylidene bis (2,6-dichlorophenol) | iminobispropylamine | 220-3 |
| 4,4'-isopropylidene bis (2,6-dichlorophenol) | isobutylamine | 152-67 |
| 4,4'-isopropylidene bis (2,6-dichlorophenol) | isodecylamine | 187-95 |
| 4,4'-isopropylidene bis (2,6-dichlorophenol) | isooctylamine | 172-84 |
| 4,4'-isopropylidene bis (2,6-dichlorophenol) | isopropanolamine | 150-7 |
| 4,4'-isopropylidene bis (2,6-dichlorophenol) | 3-isopropoxyisopropanolamine | 160-7 |
| 4,4'-isopropylidene bis (2,6-dichlorophenol) | β-isopropylaminopropionitrile | 103-7 |
| 4,4'-isopropylidene bis (2,6-dichlorophenol) | 3-isopropylamine propylamine | 122-7 |
| 4,4'-isopropylidene bis (2,6-dichlorophenol) | isoquinoline | 102-4 |
| 4,4'-isopropylidene bis (2,6-dichlorophenol) | 2,6-lutidine | 125-32 |
| 4,'-isopropylidene bis (2,6-dichlorophenol) | methanediamine | 186-90 |
| 4,4'-isopropylidene bis (2,6-dichlorophenol) | N-methyl bis amino propylamine | 219-36 |
| 4,4'-isopropylidene bis (2,6-dichlorophenol) | methylaminopropylamine | 207-13 |
| 4,4'-isopropylidene bis (2,6-dichlorophenol) | methylbenzylamine | 145-55 |
| 4,4'-isopropylidene bis (2,6-dichlorophenol) | N-methyldiethanolamine | 148-52 |
| 4,4'-isopropylidene bis (2,6-dichlorophenol) | N-methylethanolamine | 85-102 |
| 4,4'-isopropylidene bis (2,6-dichlorophenol) | 3,3'-methyl iminobis propylamine | 190-9 |
| 4,4'-isopropylidene bis (2,6-dichlorophenol) | N-methyl morpholine | 120-4 |
| 4,4'-isopropylidne bis (2,6-dichlorophenol) | N-methyl-2-pyrrolidone | 70-3 |
| 4,4'-isopropylidene bis (2,6-dichlorophenol) | morpholine | 159-60 |
| 4,4'-isopropylidene bis (2,6-dichlorophenol) | phenyldiethanolamine | 85-95 |
| 4,4'-isopropylidene bis (2,6-dichlorophenol) | phenylethanolamine | 88-95 |
| 4,4'-isopropylidene bis (2,6-dichlorophenol) | 2,2'-phenyliminodiethanolamine | 55-70 |
| 4,4'-isopropylidene bis (2,6-dichlorophenol) | γ-picoline | 96-9 |
| 4,4'-isopropylidene bis (2,6-dichlorophenol) | polyglycolamine H-119 | 156-63 |
| 4,4'-isopropylidene bis (2,6-dichlorophenol) | polyglycolamine H-169 | 123-33 |
| 4,4'-isopropylidene bis (2,6-dichlorophenol) | polyglycolamine H-176 | 210-18 |

TABLE IV-continued
AROMATIC HYDROXY COMPLEXES

| Phenol | Amine | Dissociation Temp. °C. |
|---|---|---|
| 4,4'-isopropylidene bis (2,6-dichlorophenol) | polyglycolamine H-221 | 196–200 |
| 4,4'-isopropylidene bis (2,6-dichlorophenol) | propylenediamine | 168–75 |
| 4,4'-isopropylidene bis (2,6-dichlorophenol) | pyridine | 117–30 |
| 4,4'-isopropylidene bis (2,6-dichlorophenol) | tetraethylene pentramine | 92–102 |
| 4,4'-isopropylidene bis (2,6-dichlorophenol) | tributylamine | 103–8 |
| 4,4'-isopropylidene bis (2,6-dichlorophenol) | triethylamine | 155–64 |
| 4,4'-isopropylidene bis (2,6-dichlorophenol) | triethanolamine | 139–45 |
| 4,4'-isopropylidene bis (2,6-dichlorophenol) | triethylene tetramine | 215–20 |
| 4,4'-isopropylidene bis (2,6-dichlorophenol) | triisopropanolamine | 125–30 |
| 4,4'-isopropylidene bis (2,6-dichlorophenol) | trimethylenediamine | 230–5 |
| 4,4'-isopropylidene bis (2,6-dichlorophenol) | dimethylacetamide | 132 |
| 5-chloro-2-hydroxy benzophenone | ethylenediamine | 190–4 |
| 2,2'-methylene bis (4-ethyl 6-dibutyl phenol) | benzylamine | 76–85 |
| 2,2'-methylene bis (4-ethyl 6-dibutyl phenol) | triethanolamine | 68–70 |
| o-phenyl phenol | ethylenediamine | 55–60 |
| " | formamide | 50–3 |
| " | hydrazine | 60–4 |
| 4,4'-isopropylidene bisphenol | benzylamine | 80–90 |
| " | t-butylaminoethyl-methacrylate | 90–2 |
| " | cyclohexylamine | 108–10 |
| " | dibutylamine | 120–52 |
| " | diethylamine | 117–53 |
| " | dimethylamine propylamine | 105–8 |
| " | di-n-propylamine | 90–100 |
| " | ethylenediamine | 100–4 |
| " | formamide | 66–8 |
| " | isobutylamine | 88–93 |
| " | methanediamine | 128–30 |
| " | N-methylimidinobis-propylamine | 94–8 |
| " | propylenediamine | 95–100 |
| " | triethylenetetramine | 137–9 |
| 4,4'-thiobis (6-t.butyl-m-cresol) | t.butylamino ethyl methacrylate | 62.5 |
| 4,4'-thiobis (6-t.butyl-m-cresol) | cyclohexylamine | 78–85 |
| 4,4'-thiobis (6-t.butyl-m-cresol) | ethylenediamine | 112–15 |
| 4,4'-thiobis (6-t.butyl-m-cresol) | iminobispropylamine | 85–95 |
| 4,4'-thiobis (6-t.butyl-m-cresol) | isopropylamine | 164–6 |
| 4,4'-thiobis (6-t.butyl-m-cresol) | propylenediamine | 130–6 |
| 4,4'-thiobis (6-t.butyl-m-cresol) | pyridine | 160–5 |
| 4,4'-thiobis (6-t.butyl-m-cresol) | triethanolamine | 95–8 |
| 4,4'-butylidene bis (m-cresol) | acetamine | 82–3 |
| 4,4'-butylidene bis (m-cresol) | benzylamine | 135 |
| 4,4'-butylidene bis (m-cresol) | cyclohexylamine | 214–7 |
| 4,4'-butylidene bis (m-cresol) | ethylene | 213–6 |
| 4,4'-butylidene bis (m-cresol) | triethanolamine | 68–70 |
| 2,2'-methylene bis (4-methyl-6-t.butylphenol) | 2-amino-1-butanol | 58–64 |
| 2,2'-methylene bis (4-methyl-6-t.butylphenol) | benzylamine | 69–79 |

TABLE IV-continued
AROMATIC HYDROXY COMPLEXES

| Phenol | Amine | Dissociation Temp. °C. |
|---|---|---|
| 2,2'-methylene bis (4-methyl-6-t.butylphenol) | decylamine | 52–3 |
| 2,2'-methylene bis (4-methyl-6-t.butylphenol) | 1,3-diaminopropane | 50–5 |
| 2,2'-methylene bis (4-methyl-6-t.butylphenol) | N-dibutylethylamine | 60–5 |
| 2,2'-methylene bis (4-methyl-6-t.butylphenol) | diethanolamine | 62–5 |
| 2,2'-methylene bis (4-methyl-6-t.butylphenol) | di-n-hexylamine | 81–9 |
| 2,2'-methylene bis (4-methyl-6-t.butylphenol) | ethyl cyclohexylamine | 92–4 |
| 2,2'-methylene bis (4-methyl-6-t.butylphenol) | N-ethyl diethanolamine | 68–71 |
| 2,2'-methylene bis (4-methyl-6-t.butylphenol) | isopropylaminoisopropylamine | 128–32 |
| 2,2'-methylene bis (4-methyl-6-t.butylphenol) | ethylene diamine | 54–8 |
| 2,2'-methylene bis (4-methyl-6-t.butylphenol) | hexamethyl phosphoramide | 58–65 |
| 2,2'-methylene bis (4-methyl-6-t.butylphenol) | isoquinoline | 121–5 |
| 2,2'-methylene bis (4-methyl-6-t.butylphenol) | N-methyldiethanolamine | 127–34 |
| 2,2'-methylene bis (4-methyl-6-t.butylphenol) | methyl ethanolamine | 74–84 |
| 2,2'-methylene bis (4-methyl-6-t.butylphenol) | triamylamine | 65–75 |
| 2,2'-methylene bis (4-methyl-6-t.butylphenol) | triethanolamine | 61–5 |
| p-cyclohexyl phenol | triethanolamine | 35–40 |
| " | benzylamine | 50–5 |
| " | diethylenetriamine | 70–85 |
| " | ethylene diamine | 125–30 |
| " | hexamethyl phosphoramide | 97–109 |
| " | hydrazine | 115–20 |
| " | propylene diamine | 88–90 |
| 0-cyclohexyl phenol | benzylamine | 82–95 |
| " | ethylene diamine | 88–93 |
| " | hydrazine | 75–80 |
| p.t.-butyl phenol | benzylamine | 70–80 |
| " | ethylenediamine | 70–3 |
| " | hydrazine | 45–50 |
| " | propylenediamine | 54–6 |
| p-bromophenol | formamide | 35–8 |
| 2,4-dibromophenol | benzylamine | 80–5 |
| 2,4,6-tribromophenol | t.butyl amino ethyl methacrylate | 68–71 |
| " | benzylamine | 125–30 |
| " | ethylene diamine | 135–8 |
| " | formamide | 90–3 |
| " | hydrazine | 145–54 |
| " | propylene diamine | 87–92 |
| Pentachlorophenol | benzylamine | 155–60 |
| " | t.-butylaminoethyl methacrylate | 115–20 |
| " | diethanolamine | 145–55 |
| " | diethylenetriamine | 185–90 |
| " | ethylenediamine | 115–20 |
| " | formamide | 100–105 |
| " | hexamethyl phosphoramide | 79–83 |
| " | hydrazine | 200–205 |
| " | propylenediamine | 168–72 |
| " | triethanolamine | 133–7 |
| 2,6-dichlorophenol | benzylamine | 100–5 |
| " | t.butylaminoethyl methacrylate | 100–5 |
| " | diethanolamine | 83–6 |
| " | ethylenediamine | 110–15 |
| " | formamide | 40–5 |
| " | hydrazine | 115–20 |
| " | propylenediamine | 115–25 |
| 2-chloro-4-phenyl-phenol | benzylamine | 95–100 |
| " | ethylenediamine | 130–5 |
| " | hydrazine | 108–12 |
| " | propylenediamine | 50–4 |
| tetrachlorophenol | benzylamine | 115–25 |
| " | t.butylaminoethyl | |

TABLE IV-continued
AROMATIC HYDROXY COMPLEXES

| Phenol | Amine | Dissociation Temp. °C. |
|---|---|---|
| " | methacrylate | 95–100 |
| " | diethanolamine | 110–25 |
| " | ethylenediamine | 192–5 |
| " | formamide | 85–90 |
| " | hydrazine | 163–5 |
| " | propylenediamine | 165–70 |
| " | triethanolamine | 98–104 |
| 2,4,6-trichlorophenol | benzylamine | 120–5 |
| " | t.butylaminoethyl methacrylate | 70–5 |
| " | ethylenediamine | 105–14 |
| " | formamide | 85–90 |
| " | hydrazine | 150–7 |
| " | propylenediamine | 100–5 |
| 2,4-dichloro-1-naphthol | benzylamine | 55–60 |
| " | diethanolamine | 65–70 |
| " | diethylenetriamine | 79–83 |
| " | formamide | 78–82 |
| " | hydrazine | 83–93 |
| " | triethanolamine | 63–5 |
| 2-naphthol | benzylamine | 40–5 |
| " | ethylenediamine | 86–9 |
| " | formamide | 56–59 |
| " | hydrazine | 110–12 |
| 4,4-isopropylidene bis (p-chlorophenol) | benzylamine | 105–10 |
| 4,4-isopropylidene bis (p-chlorophenol) | formamide | 55–60 |
| 4,4-isopropylidene bis (p-chlorophenol) | hexamethyl phosphoramide | 46–8 |
| 4,4-isopropylidene bis (p-chlorophenol) | hydrazine | 100–112 |
| 2,6-dibromo-t.butyl phenol | benzylamine | 75–80 |
| " | diethylenetriamine | 85–96 |
| " | ethylenediamine | 95–105 |
| " | hydrazine | 105–110 |
| " | propylenediamine | 95–100 |
| " | triethanolamine | 104–6 |
| p-phenoxy phenol | ethylenediamine | 56–62 |
| " | hydrazine | 48–56 |
| 2,4,5-trichlorophenol | benezylamine | 118–20 |
| " | t.butylaminoethyl methacrylate | 55–60 |
| " | diethanolamine | 105–10 |
| " | diethylenetriamine | 85–95 |
| " | ethylenediamine | 55–60 |
| " | hydrazine | 94–100 |
| " | propylenediamine | 96–104 |
| 1,1-di (4-hydroxyphenyl) cyclohexane | diethanolamine | 100–112 |
| 1,1-di (4-hydroxyphenyl) cyclohexane | propylenediamine | 120–5 |
| 1,1-di (3,5-dibromo-4-hydroxy phenyl) cyclohexane | diethanolamine | 149–54 |
| 1,1-di (3,5-dibromo-4-hydroxy phenyl) cyclohexane | propylenediamine | 175–80 |
| 3,3-bis (3,5-dibromo-4-hydroxy phenyl) pentane | propylenediamine | 183–92 |
| 2,2-bis (3,5-dibromo-4-hydroxy phenyl) pentane | diethanolamine | 110–18 |
| 2,2 bis (3,5-dibrom-4-hydroxy phenyl) pentane | propylenediamine | 180–90 |
| bis (3,5-dibromo-4-hydroxy phenyl) methane | diethanolamine | 115–23 |
| 2,2-bis (3,5-dibromo-4-hydroxy phenyl) butane | diethanolamine | 142–5 |
| 2,2-bis (3,5-dibromo-4-hydroxy phenyl) butane | propylenediamine | 174–6 |
| 3,3'-5,5'-tetrabromo-4,4'-dihydroxy biphenyl | diethanolamine | 173–80 |
| 3,3'-5,5'-tetrabromo-4,4'-dihydroxy biphenyl | propylene diamine | 180–2 |
| 1-phenyl-1, 1-di (3,5-dibromo-4-hydroxy phenyl) ethane | diethanolamine | 145–50 |
| 1-phenyl-1, 1-di (3,5-dibromo-4-hydroxy phenyl) | | |

TABLE IV-continued
AROMATIC HYDROXY COMPLEXES

| Phenol | Amine | Dissociation Temp. °C. |
|---|---|---|
| ethane 2,2-di (3,5-dibromo-4-hydroxyphenyl) 4-methyl-pentane | propylenediamine | 185–200 |
| | diethanolamine | 115–20 |
| 2,2-di (3,5-dibromo-4-hydroxyphehyl) 4-methyl-penetane | propylenediamine | 190–4 |
| 2,2-di (3,5-dibromo-4-hydroxy phenyl) heptane | diethanolamine | 145–50 |
| 2,2-di (3,5 dibromo-4-hydroxy phenyl) heptane | propylenediamine | 195–7 |
| 1,1-di (3,5-dibromo-4-hydroxy phenyl) butane | diethanolamine | 100–15 |
| 1,1-di (3,5-dibromo-4-hydroxy phenyl) butane | propylene diamine | 173–7 |
| 2,2-di (3,5-dibromo-4-hydroxy phenyl) octane | diethanolamine | 140–2 |
| 1,1-di (3,5-dibromo-4-hydroxy phenyl) ethane | diethanolamine | 105–10 |
| 1,1-di (3,5-dibromo-4-hydroxy phenyl) ethane | propylenediamine | 175–8 |
| 2,4-dihydroxybenzophenone | propylenediamine | 212–18 |
| 3,5-dichlorosalicylaldehyde | diethanolamine | 100–5 |
| " | hexamethyl phosphoramide | 70–84 |
| " | propylenediamine | 135–45 |
| bisphenol A disalicylate | diethanolamine | 150–5 |
| " | propylenediamine | 155–75 |
| tetrachlorohydroquinone | diethanolamine | 146–50 |
| " | propylene diamine | 175–80 |
| 2-hydroxy-5-phenyl-propiophenone | propylenedlamine | 180–5 |
| 2,4,6-tribenzoyl resorcinol | diethanolamine | 125–30 |
| " | propylenediamine | over 280 |
| 3,5-dibromosalicylaldehyde | diethanolamine | 90–8 |
| " | hexamethylphosphoramide | 83–95 |
| " | propylenediamine | 150–2 |
| 2-isopropyl-4,6-dinitrophenol | diethanolamine | 105–10 |
| 2-isopropyl-4,6-dinitrophenol | propylenediamine | 188–90 |
| 3,4,6-trichloro-2-nitro phenol | diethanolamine | 146–50 |
| 3,4,6-trichloro-2-nitro phenol | propylenediamine | 185–90 |
| 1,1-methylenebis-2-naphthol | diethanolamine | 135–40 |
| " | hexamethylphosphoramide | 142–4 |
| " | propylenediamine | 160–5 |
| 1,1-di-2-naphthol | diethanolamine | 158–74 |
| " | hexamethylphosphoramide | 112–20 |
| " | propylenediamine | 120–30 |
| 1,1-thio bis (2-naphthol) | diethanolamine | 135–42 |
| " | hexamethyl phosphoramide | 124–8 |
| " | propylenediamine | 120–5 |
| p-chlorotrisphenol | diethylene triamine | 132–55 |
| " | hexamethylphosphoramide | 149–51 |
| 1,1-bis (3,5-dichloro-4-hydroxyphenyl) cyclohexane | benzylamine | 144–52 |
| 1,1-bis (3-5-dichloro-4-hydroxy phenyl) cyclohexane | diethanolamine | 140–3 |
| 1,1-bis (3-5-dichloro-4-hydroxy phenyl) cyclohexane | diisopropyl ethanolamine | 164–8 |
| 1,1-bis (3-5-dichloro-4-hydroxy phenyl) cyclohexane | dimethyl ethanolamine | 169–85 |
| 1,1-bis (3-5-dichloro-4-hydroxy phenyl) cyclohexane | methyl diethanolamine | 131–9 |
| 1,1-bis (3-5-dichloro-4-hydroxy phenyl) cyclohexane | methyl ethanolamine | 165–71 |
| 1,1-bis (3-5-dichloro-4-hydroxy phenyl) cyclohexane | polyglycolamine H-176 | 192–200 |
| pentabromophenol | aminoethylethanolamine | 131–3 |
| " | 2-amino-2-methyl-1,3-propanediol | 170–9 |
| " | benzylamine | 155–8 |
| " | diethanolamine | 158–61 |
| " | diisopropanolamine | 178–37 |
| " | diisopropylethanolamine | 130–3 |
| " | N-ethyldiethanolamine | 93–8 |
| " | methyl diethanolamine | 120–3 |

TABLE IV-continued
AROMATIC HYDROXY COMPLEXES

| Phenol | Amine | Dissociation Temp. °C. |
|---|---|---|
| " | methyl ethanolamine | 163–5 |
| " | triethanolamine | 129–34 |
| hydroquinone | acetamide | 99–105 |
| " | formamide | 63–5 |
| " | morpholine | 64–8 |
| " | piperazine | 187–95 |
| resorcinol | hydrazine | 48–55 |
| " | piperazine | 147–52 |
| pyrogallol | formamide | 55–8 |
| " | acetamide | 58–65 | e. Substrates

The substrates used were a 25 lb/3000 sq.ft. bleached sulfite paper and 3 mil du Pont Mylar brand polyester film.

f. Test equipment

A 3M Co. Thermofax Secretary thermal copier was used for reproduction and also for preparation of transparencies. A Texas Instrument Silent 700 thermal matrix printer was used to demonstrate printing. A Sanborn 500 Viso Cardiette recorder was used to demonstrate chart recording capabilities.

The preferred embodiment of the invention is the use of a combination of color formers with a molecular complex of an amine and a phenolic compound and optionally an accelerator. Stabilizers may also be used if so desired.

Preparation of Coatings

The phenolic hydrogen bonded complexes are dispersed in a solution of a binder and ball-milled or otherwise ground until a fine particle size, preferably below 10 microns, is obtained. Any solvent-binder system may be used which does not dissolve and dissociate the phenolic complex. Some suitable systems include water solutions of polyvinyl alcohol, hydroxyethyl cellulose, and other common water-soluble polymeric resins. Methanol or ethanol solutions of nitrocellulose, ethylcellulose, and other alcohol-soluble resins can be used. Likewise, hydrocarbon solutions of styrene polymers or copolymers, acrylate or methacrylate polymers or copolymers, hydrocarbon resins, elastomeric polymers, and the like, can be used. The limits for the concentration are governed by desirable coating viscosities, dry weight of the coating, and the like. Concentrations of complexes varying between 5 and 50 percent have been found to be convenient.

Similarly, the leuco dye color-forming material is also dispersed by ball-milling or by other convenient means in a solvent-binder system which will not dissolve and dissociate the phenolic molecular complex. The reactive ingredients are ground separately in this case to permit the more convenient variation of the ratios of the co-reacting leuco dyes and phenolic complexes. However, this is not a requirement as the leuco dyes and phenolic complexes have been ground together without encountering any signs of mix instability or loss of the marking characteristics of the dried coating. This is not true when the leuco dye, for example Crystal Violet Lactone, is ground with the free phenolic material. The ground mixture becomes highly colored and is useless as a coating material.

Coating Applications

The mixtures of grinds of the leuco dyes and molecular complexes of phenolic materials were applied by Meyer rod to a 25 lb/3000 sq.ft sulfite base paper and allowed to air-dry. Dry coating weights of the thermosensitive coatings were varied from 1.5 lb/3000 sq.ft. to over 10 lb/3000 sq.ft. and useful records were made with each coating.

Specific Examples

The ingredients are individually dispersed by ball-milling as a 15 percent concentration in a 5 percent solution of polyvinyl alcohol in water. These are combined in the ratios indicated in the table and coated onto the substrate with a No. 16 wire wound Meyer rod and air dried. The coated substrates were imaged in the test equipment to gove the colors indicated in the table.

COLOR PRECURSORS

Spiropyrans

| Code | Base | Aldehyde |
|---|---|---|
| A | 2-methylbenzothiazolium methyl tosylate | 2-hydroxyl-1-naphthaldehyde |
| B | " | salicylaldehyde |
| C | 5-chloro-2-methylene-1,3,3-trimethyl-indoline | salicylaldehyde |
| D | 5-chloro-2-methylene-1,3,3-trimethyl-indoline | 5-nitrosalicylaldehyde |
| E | 5-chloro-2-methylene-1,3,3-trimethyl-indoline | 5-bromosalicylaldehyde |
| F | 5-chloro-2-methylene-1,3,3-trimethyl-indoline | 3,5-dibromosalicylaldehyde |
| G | 2-methylene-1,3,3-trimethylindoline | 5-nitrosalicylaldehyde |
| H | " | o-vanillin |
| I | 3-methyl-di-β-naphthospiropyran | |

Lactones

| Code | Name |
|---|---|
| J | Crystal Violet lactone |
| K | 3,3-bis-p-aminophenylphthalide |
| L | 3,3-bis(1-ethyl-2-methylindol-3-yl)-phthalide |
| M | Malachite Green lactone |

Cyclic Polyketones

| Code | Name |
|---|---|
| I | Ninhydrin |
| II | Hydrindantin |
| III | Isatin |
| IV | Alloxan |

IMAGED SHEETS

| Lactone or Spiropyran | Cyclic Polyketone | Phenolic Complex | Other Additives | Ratios | Coating Wt. lb/3000 sq ft | Trace Color |
|---|---|---|---|---|---|---|
| J | II | — | 4-phenylpiperidine | 2/4/2 | 3.3 | black |
| J | II | — | — | 1/2 | 2.5 | blue-gray |
| J | II | hexachlorophene/cyclohexylamine | — | 2/3/2 | 4.0 | v.dark blue-gray |
| J | II | — | p-toluic acid 4-phenylpiperidine | 2/4/1/2 | 3.2 | green-black |
| J | II | hexachlorophene/dimethylethanolamine | — | 1/2/2 | 3.5 | black |
| J | II | Actomer/cyclohexylamine | — | 1/2/2 | 3.1 | black |
| J | II | — | piperazine/terephthaldehyde | 1/2/1 | 4.3 | black |
| J | II | Actomer/cyclohexylamine | — | 1/1/2 | 3.0 | black |
| J | II | Actomer/diethanolamine | — | 1/2/2 | 2.0 | slate blue |
| K | II | Actomer/ethanolamine | — | 1/2/2 | 1.0 | black |
| K | II | — | — | 1/2 | 2.2 | dark gray |
| J | III | — | — | 1/2 | 1.8 | blue-green |
| J | IV | — | — | 1/2 | 2.3 | dark-red-brown |
| J | II | 1,1-bi-2-naphthol/cyclohexylamine | — | 1/2/2 | 3.7 | black |
| J | II | 1,1-bi-2-naphthol/cyclohexylamine | — | 2/1/1 | 3.0 | black |
| J | II | 1,1-bi-2-naphthol/cyclohexylamine | — | 1/2/1 | 2.7 | black |
| J | II | 1,1-bi-2-naphthol/cyclohexylamine | — | 1/1/1 | 3.6 | black |
| J | II | 1,1-bi-2-naphthol/cyclohexylamine | — | 2/1/2 | 3.3 | black |
| J | II | dichlorohydroquinone/cyclohexylamine | — | 2/2/1 | 4.5 | black |
| J | II | dichlorohydroquinone/cyclohexylamine | — | 1/2/1 | 5.0 | blue-black |
| J | II | dichlorohydroquinone/cyclohexylamine | — | 1/2/2 | 3.6 | blue-black |
| J | II | Actomer/diethanolamine | — | 1/2/2 | 1.9 | blue-gray |
| J | II | hexachlorophene/cyclohexylamine | sulfanilamide | 1/3/1/2 | 4.3 | black |

IMAGED SHEETS -continued

| Lactone or Spiropyran | Cyclic Polyketone | Phenolic Complex | Other Additives | Ratios | Coating Wt. lb/3000 sq ft | Trace Color |
|---|---|---|---|---|---|---|
| J | II | — | sulfanilamide | 1/3/2 | 3.8 | black |
| J | II | — | Sulfasan R | 1/3/2 | 4.0 | black |
| J | II | — | Santocure Powder | 1/2/2 | 4.4 | black |
| J | II | hexachlorophene/cyclohexylamine | Sulfasan R | 1/2/1/2 | 4.0 | black |
| B | II | — | — | 1/2 | 3.3 | brown-black |
| J | I | hexachlorophene/cyclohexylamine | — | 1/1/1 | 3.7 | purple |
| J | II | hexachlorophene/cyclohexylamine | 4-phenyl-3-thio-semicarbazide | 1/3/2/2 | 3.5 | black |
| J,L | II | hexachlorophene/cyclohexylamine | — | 1/1/2/1 | 3.2 | purple-black |
| L | II | — | — | 1/2 | 2.7 | lavender |
| J | II | tetrabromobisphenol A/cyclohexylamine | — | 1/4/8 | 5.0 | black |
| J | I | — | — | 1/2 | 4.0 | slate blue/black |
| A | II | — | — | 1/2 | 4.1 | black |
| A | II | hexachlorophene/cyclohexylamine | — | 1/1/12 | 4.0 | black |
| A | I | — | — | 1/1 | 4.7 | black |
| A | II | — | — | 1/10 | 3.0 | dark brown |
| K | II | Actomer/ethanolamine | — | 1/2/1 | 1.9 | dark brown |
| J | II | hexachlorophene/cyclohexylamine | — | 1/3/8 | 4.0 | black |
| C | II | — | — | 1/2 | 4.5 | dark brown |
| C | II | hexachlorophene/cyclohexylamine | — | 1/2/2 | 3.5 | darker brown |
| D | II | — | — | 1/2 | 4.0 | red-brown |
| D | II | hexachlorphene/cyclohexylamine | — | 1/2/2 | 3.5 | dark brown |
| F | II | — | — | 1/2 | 4.2 | brown |
| F | II | hexachlorophene/cycloxylamine | — | 1/2/2 | 4.0 | dark brown |
| G | II | — | — | 1/2 | 4.3 | violet-black |
| G | II | hexachlorophene/cyclohexylamine | — | 1/2/2 | 5.0 | black |
| H | II | hexachlorophene/cyclohexylamine | — | 1/2 | 4.8 | dark brown |
| I | II | — | — | 1/2 | 3.5 | blue-black |
| I | II | hexachlorophene/cyclohexylamine | — | 1/2/2 | 3.2 | black |
| M | — | hexachlorophene/cyclohexylamine | — | 1/8 | 4.0 | light blue-green |
| M | II | hexachlorophene/cyclohexylamine | — | 1/2 | 4.3 | purple-gray |
| M | II | — | hexachlorophene | 1/2/2 | 5.0 | slate blue-gray |
| M | II | — | phenyl urea | 1/2/2 | 4.5 | dark blue-black |
| M | II | — | 4-phenyl-piperidine | 1/2/2 | 3.7 | blue-black |
| M | II | — | 4-hydroxy-4-phenyl piperidine | 1/2/2 | 3.7 | brown |
| M | II | — | piperazine-terephthaldehyde condensate | 1/2/2 | 3.8 | olive green-black |

Activators may be added to the heat-sensitive compositions of the invention to lower the activation temperatures of the above systems and to intensify the image mark. Some preferred activators are ureas and thioureas such as phenylurea, phenylthiourea and allylurea; carbanilide; thiocarbanilide; zinc acetoacetonate; fatty acid salts of zinc such as zinc stearate and zinc palmitate; and salicylanilde.

I claim:

1. A mixture of heat-sensitive color precursors comprising
   (a) a cyclic polyketo compound reactive with amines and amides at elevated temperatures to form a color; and
   (b) a chromogenic compound selected from the group consisting of lactone type leuco dyes and spiropyran type leuco dyes, said chromogenic compound being reactive with phenols at elevated temperatures to form a color.

2. The mixture of heat-sensitive color precursors of claim 1, wherein said cyclic polyketo compound and said chromogenic compound are combined as an adduct.

3. A heat-sensitive recording composition comprising the mixture of heat-sensitive color precursors of claim 1, and further comprising
(c) binder means for binding the composition to a substrate.

4. The composition of claim 3, and further comprising
(d) a phenol selected from either Table III or Table IV of the specification; and
(e) an amine or amide.

5. The composition of claim 4, wherein said phenol and said amine or amide are combined in a hydrogen-bonded molecular complex.

6. The composition of claim 3, wherein said chromogenic compound is a lactone selected from Table I of the specification.

7. The composition of claim 3, wherein said chromogenic compound is a spiropyran selected from Table II of the specification.

8. The composition of claim 3, wherein said cyclic polyketo compound is a compound selected from the group consisting of ninhydrin, hydrindantin, isatin, alloxan, and their homologs.

9. The composition of claim 3, wherein said amine or amide is selected from Table IV of the specification.

10. The composition of claim 3, and further comprising an activator for lowering the temperature of color formation, said activator comprising a compound selected from the group consisting of ureas; thioureas; carbanilide; thiocarbanilide; zinc acetoacetonate; fatty acid salts of zinc; and salicylanilide.

11. A method for producing a heat-sensitive recording composition comprising the steps of
dissolving a binder in a solvent in which complexes of a phenol and a complexing agent selected from the group consisting of amines and amides is insoluble, to form a binder-solvent solution,
dispersing in said solution a chromogenic compound reactive with a phenol at elevated temperatures to develop a color contrasting visibly with a background color of said composition, said chromogenic compound being selected from the group consisting of lactone type leuco dyes and spiropyran type leuco dyes; a cyclic polyketo compound reactive with amines and amides at elevated temperatures to form a color contrasting visibly with a background color of said composition; and a hydrogen-bonded molecular complex of a phenol selected from Table IV of the specification and a complexing agent selected from the group consisting of amines and amides, to form a dispersion,
applying said dispersion to a substrate, and
evaporating solvent from said dispersion to form a thermosensitive coating adapted to develop a color at elevated temperatures.

12. The method of claim 11, wherein said cyclic polyketo compound is selected from the group consisting of ninhydrin, hydrindantin, isatin, alloxan, and their homologs.

* * * * *